(12) United States Patent
Cudak et al.

(10) Patent No.: US 9,872,223 B1
(45) Date of Patent: Jan. 16, 2018

(54) AUTONOMOUSLY IDENTIFYING AN ALTERNATE CONTACT DEVICE

(71) Applicant: LENOVO Enterprise Solutions (Singapore) PTE. LTD., New Tech Park (SG)

(72) Inventors: Gary D. Cudak, Wake Forest, NC (US); Joseph F. Herman, Raleign, NC (US); John M. Weber, Wake Forest, NC (US); Shareef F. Alshinnawi, Apex, NC (US)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 15/231,327

(22) Filed: Aug. 8, 2016

(51) Int. Cl.
| | |
|---|---|
| *H04W 40/20* | (2009.01) |
| *H04L 29/08* | (2006.01) |
| *H04W 4/00* | (2009.01) |
| *H04W 24/04* | (2009.01) |
| *H04W 4/02* | (2009.01) |

(52) U.S. Cl.
CPC ............ *H04W 40/20* (2013.01); *H04L 67/22* (2013.01); *H04W 4/008* (2013.01); *H04W 4/027* (2013.01); *H04W 4/028* (2013.01); *H04W 24/04* (2013.01)

(58) Field of Classification Search
CPC .................................................... H04W 40/20
USPC ................................................. 455/443–445
See application file for complete search history.

(56) References Cited

U.S. PATENT DOCUMENTS

| | | | |
|---|---|---|---|
| 2016/0044151 A1* | 2/2016 | Shoemaker ........... | H04M 19/04 455/556.1 |
| 2016/0286366 A1* | 9/2016 | Hsieh ..................... | H04W 4/12 |

OTHER PUBLICATIONS

Google, Smart Call Forwarding Android Appson GooglePlay, https://play.google.com/store/apps/details?id=klozin. SmartCallForwarding&hl=en, Last visited Jun. 2, 2016.
Google, Quick Call Forward Android Apps on Google Play, https://play.google.com/store/apps/details?id=easy.call.forward&hl=en, Last Visited Jun. 2, 2016.
Filip, Filip is Changing the Way Patents and Kids Stay Connected, http://www.myfilip.com/about-filip/, Last visited Jun. 20, 2016.

\* cited by examiner

*Primary Examiner* — Michael T Vu
(74) *Attorney, Agent, or Firm* — Kunzler, PC.

(57) ABSTRACT

An apparatus for contacting a user via an alternate device includes a tracker module, an accessibility module, a contact identification module, and a contact router module. The tracker module obtains tracking information from one or more electronic devices of a user. At least one of the one or more electronic devices includes a communication device. The accessibility module determines, based on the tracking information, that the user is inaccessible via the communication device. The contact identification module autonomously identifies an alternate device for contacting the user. The alternate device is projected, based on the tracking information, to be in proximity to the user. The contact router module reroutes an incoming communication based on the alternate device.

18 Claims, 5 Drawing Sheets

AUTONOMOUSLY IDENTIFYING AN ALTERNATE CONTACT DEVICE

FIELD

The subject matter disclosed herein relates to contacting people and more particularly relates to autonomously identifying an alternate contact device for a person.

BACKGROUND

Users of various types of electronic device may be contacted in various ways, such as by phone, email, text messaging, messaging apps, web-based services and the like. As electronic devices such as computers, tablets, mobile phones, and the like have become increasingly feature-rich and portable, many users of such devices have also come to expect that they can regularly and easily contact (and be contacted by) other users. However, portable devices such as mobile phones may also be easily lost, misplaced, or left behind.

BRIEF SUMMARY

An apparatus for contacting a user via an alternate device is disclosed. A method and computer program product also perform the functions of the apparatus. The apparatus includes a tracker module, an accessibility module, a contact identification module, and a contact router module. The tracker module obtains tracking information from one or more electronic devices of a user. At least one of the one or more electronic devices includes a communication device. The accessibility module determines, based on the tracking information, that the user is inaccessible via the communication device. The contact identification module autonomously identifies an alternate device for contacting the user. The alternate device is projected, based on the tracking information, to be in proximity to the user. The contact router module reroutes an incoming communication based on the alternate device.

In one embodiment the accessibility module determines that the user is inaccessible prior to the contact router module receiving the incoming communication. In a certain embodiment, the tracking information used to determine that the user is inaccessible includes location information for the communication device, movement information for the communication device, user activity information for the communication device, and/or an indication of whether the communication device is within a pairing range of a wearable electronic device for the user. In some embodiments, the accessibility module determines that the user is inaccessible in response to the user failing to respond to a communication via the communication device.

In one embodiment the tracking information used to project that the alternate device is in proximity to the user includes a location for the communication device, a projected location for the user, and/or information about one or more devices within range of the communication device. In a certain embodiment, the alternate device includes a communication device for a person other than the user and/or a communication device for a location associated with the user. In some embodiments, the contact identification module, prior to receiving the incoming communication, requests permission from the alternate device to reroute the incoming communication.

In one embodiment, rerouting the incoming communication includes forwarding the incoming communication to the alternate device. In a certain embodiment, rerouting the incoming communication includes relaying contact information for the alternate device back to an initiator of the incoming communication. In some embodiments, rerouting the incoming communication includes translating the incoming communication from a first communication mode to a second communication mode. In certain embodiments, the contact router module provides information about rerouting the incoming communication, to an initiator and/or a recipient of the incoming communication.

In one embodiment, the accessibility module determines that the user is inaccessible without the user explicitly identifying an accessibility state. In a certain embodiment, the contact identification module autonomously identifies the alternate device without the user explicitly identifying the alternate device.

A method for contacting a user via an alternate device includes obtaining tracking information from one or more electronic devices of a user. At least one of the one or more electronic devices includes a communication device. The method includes determining, based on the tracking information, that the user is inaccessible via the communication device. The method includes autonomously identifying an alternate device for contacting the user. The alternate device is projected, based on the tracking information, to be in proximity to the user. The method includes rerouting an incoming communication based on the alternate device.

In one embodiment, determining that the user is inaccessible occurs prior to receiving the incoming communication. In a certain embodiment, the tracking information used to determine that the user is inaccessible includes location information for the communication device, movement information for the communication device, user activity information for the communication device, and/or an indication of whether the communication device is within a pairing range of a wearable electronic device for the user.

In one embodiment, the tracking information used to project that the alternate device is in proximity to the user includes a location for the communication device, a projected location for the user, and/or information about one or more devices within range of the communication device. In a certain embodiment, rerouting the incoming communication includes forwarding the incoming communication to the alternate device and/or relaying contact information for the alternate device back to an initiator of the incoming communication. In some embodiments, the method also includes providing information about rerouting the incoming communication, to an initiator and/or a recipient of the incoming communication.

A program product for contacting a user via an alternate device includes a computer readable storage medium that stores code executable by a processor. The executable code includes code to perform obtaining tracking information from one or more electronic devices of a user. At least one of the one or more electronic devices includes a communication device. The executable code includes code to perform determining, based on the tracking information, that the user is inaccessible via the communication device. The executable code includes code to perform autonomously identifying an alternate device for contacting the user. The alternate device is projected, based on the tracking information, to be in proximity to the user. The executable code includes code to perform rerouting an incoming communication based on the alternate device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
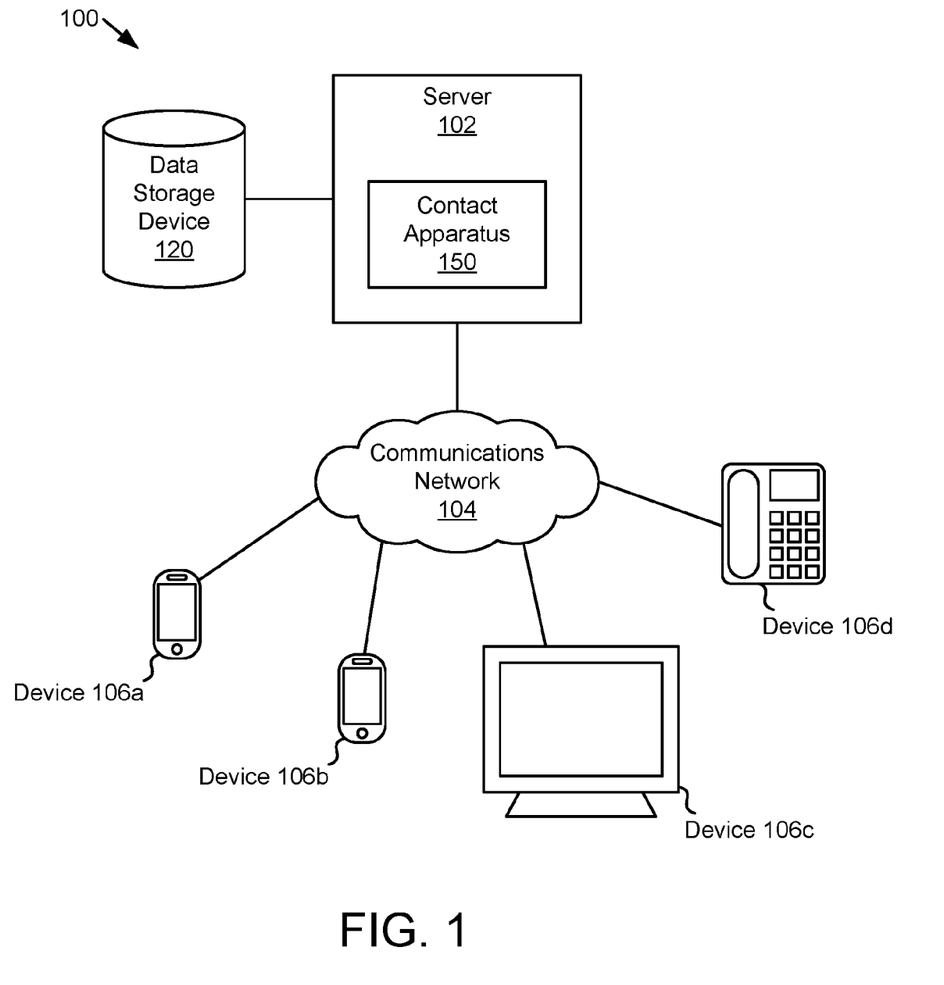
FIG. 1 is a schematic block diagram illustrating one embodiment of a system for contacting a user via an alternate device.

FIG. 1 depicts one embodiment of a system 100 for contacting a user via an alternate device. In the depicted embodiment, the system 100 includes a contact apparatus 150 operating on a server 102, a communications network 104, one or more electronic devices 106, and a data storage device 120, which are described below.

In general, in various embodiments, the contact apparatus 150 may obtain tracking information from one or more electronic devices 106 of a user (including a communication device), determine based on the tracking information that the user is inaccessible via the communication device, autonomously identify an alternate device for contacting the user (where the alternate device is projected, based on the tracking information, to be in proximity to the user), and reroute an incoming communication based on the alternate device. In certain embodiments, using tracking information to determine user accessibility and autonomously identify an alternate device for rerouting communications may allow the contact apparatus 150 to provide a way of contacting a user who has lost, misplaced, or left behind a mobile phone, tablet, or other communication device.

In a further embodiment, using tracking information to determine user accessibility and autonomously identify an alternate device for rerouting communications may provide one or more alternative ways of contacting a user, even in circumstances when the user's inaccessibility may have been unplanned, and/or when the user may have failed to explicitly set up an alternative way to be contacted. The contact apparatus 150 is described in further detail below with regard to the apparatus 200 of FIG. 2.

In the depicted embodiment, the contact apparatus 150 operates on or is embodied by the server 102. In another embodiment, the contact apparatus 150 may operate on or be embodied by one or more of the user's electronic devices 106, a combination of the server 102 and the user's electronic devices 106, a computer that implements the contact apparatus 150 outside a server/client architecture, or the like. In view of this disclosure, many ways to implement a contact apparatus 150 are clear.

In one embodiment, the server 102 may be a mainframe, a blade server, a workstation, a desktop computer, a laptop computer, a virtual machine, or the like. The server 102 may use the contact apparatus 150 to obtain tracking information, determine user accessibility, identify an alternate contact device, reroute incoming communications, and the like.

In various embodiments, one or more electronic devices 106 may be in communication with the server 102 via the communications network 104. For example, in the depicted embodiment, the electronic devices 106 include mobile phones 106a, 106b, a computer 106c, and a landline phone 106d. In various embodiments, the system 100 may include more of fewer electronic devices 106. The electronic devices 106 may belong to, be associated with, or be used by one or more users. For example, in certain embodiments, electronic devices 106 may include one or more electronic devices 106 of a user, for whom the contact apparatus 150 obtains tracking information and reroutes incoming communication.

In a further embodiment, electronic devices 106 may include one or more electronic devices 106 for one or more further users. Thus, in one embodiment, if a user is inaccessible via one electronic device 106, the contact apparatus 150 may reroute communications to an alternate electronic device 106 belonging to or associated with that user, but in another embodiment the contact apparatus 150 may reroute communications to an alternate electronic device 106 belonging to or associated with another user. In certain embodiments, the system 100 may include more or fewer electronic devices 106 than are depicted in FIG. 1, including electronic devices of various types (whether depicted or not), such as mobile phones 106a, 106b, a home computer 106c, a landline phone 106d, a work computer, a home theater PC, a game console, an internet connected television, a fitness monitor, or the like.

In one embodiment, the contact apparatus 150 may obtain tracking information from one or more of a user's electronic devices 106. In various embodiments, the contact apparatus 150 may use tracking information from one or more of a user's electronic devices 106 to determine whether the user is accessible via a particular communication device. The contact apparatus 150 may also use tracking information to identify an alternate electronic device 106 for contacting the user.

At least one of a user's electronic devices 106 may be a communication device, capable of being used to contact or communicate with the user. Tracking information from a communication device may suggest whether the user is accessible via that communication device. For example, in one embodiment, a user's activity history on a communication device may suggest that the user has recently used the communication device, and is likely accessible.

In another embodiment the user's activity history on a communication device may suggest that the user has not recently used the communication device, and is not likely accessible. Additionally, however, tracking information from other communication devices, or from electronic devices 106 other than communication devices, may also suggest whether a user is accessible via a first communication device. For example, in one embodiment, tracking information from a home telephone may indicate that a user is at home, and not accessible via an office telephone. In another embodiment, an internet-enabled home television may not be a communication device, because it does not provide functionality for contacting a user, but tracking information (such as viewing history) from the television may still suggest that the user is at home, and not accessible via an office telephone.

In certain embodiments, the communications network 104 may include any network or collection of networks that may communicate with the server 102 to communicate tracking information or to reroute communications. For example, in various embodiments, the communications network 104, in various embodiments, may include a local area network ("LAN"), a wireless network, the Internet, a public switched telephone network ("PSTN"), a Voice over Internet Protocol ("VOIP") network, a mobile telephony network, a mobile data network, or the like. The communications network 104 may include one or more connections, switches, routers, data cables, transmitters, and the like normally associated with a communications network 104. In one embodiment, the communications network 104 includes multiple networks functioning to transmit tracking information between the server 102 and the electronic devices 106, to route communications to or from electronic devices 106, to transfer data between the data storage device 120 and the server 102, or the like.

A wireless connection for the communications network 104 may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials ("ASTM"), the DASH? Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification ("IrPHY") as defined by the Infrared Data Association ("IrDA"). Alternatively, the wireless connection may be a cellular telephone network communication. All standards and/or connection types include the latest version and revision of the standard and/or connection type as of the filing date of this application.

In one embodiment, the data storage device 120 is internal to the server 102 or other computing device that includes the contact apparatus 150. In another embodiment, the data storage device 120 is located externally to the server 102, laptop, etc. that includes the contact apparatus 150. For example, the data storage device 120 may include one or more computer readable storage media in a network, such as a storage area network, in an array, etc. The data storage device 120 may include a hard drive, solid state drive, hybrid drive, storage array, or the like. In certain embodiments, the data storage device 120 may store tracking information obtained by the contact apparatus 150 from one or more of the electronic devices 106.

In some embodiments, the data storage device 120 may store contact information for electronic device 106. In various embodiments, identifying alternate contact devices based on tracking information stored by the data storage device 120 may allow the contact apparatus 150 to reroute communications to users without the users explicitly setting up alternative ways of being contacted. One of skill in the art will recognize other forms of a data storage device 120 for storing tracking information, in communication with a contact apparatus 150.

Figure 2:
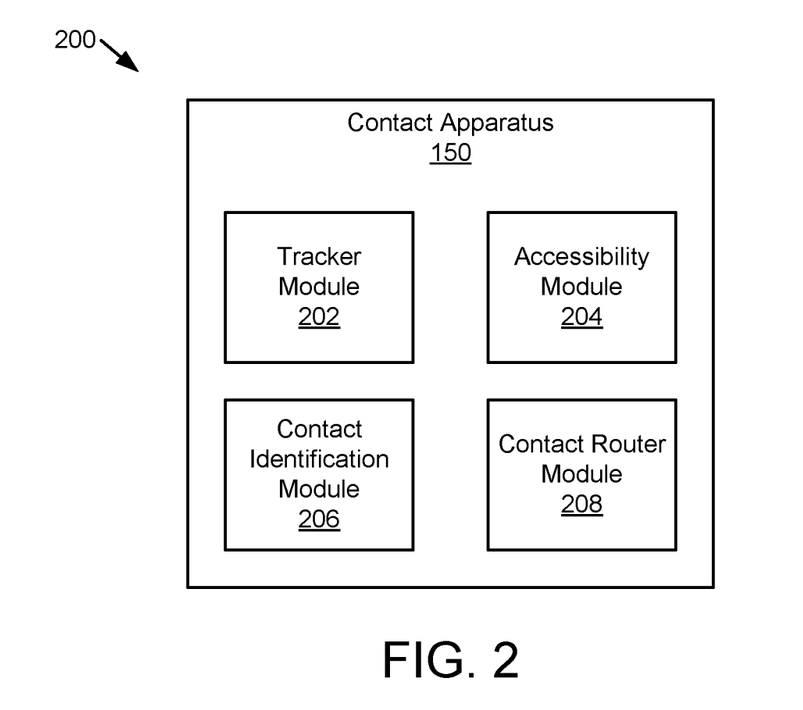
FIG. 2 is a schematic block diagram illustrating one embodiment of an apparatus for contacting a user via an alternate device.

FIG. 2 depicts one embodiment of an apparatus 200 for contacting a user via an alternate device. The apparatus 200 includes one embodiment of the contact apparatus 150 with a tracker module 202, an accessibility module 204, a contact identification module 206, and a contact router module 208, which are described below.

In the depicted embodiment, the contact apparatus 150 includes a tracker module 202 that obtains tracking information from one or more electronic devices 106 of a user. In various embodiments, a tracker module 202 may include a data storage device 120, a database storing information about electronically tracked user activities, user interface elements such as a screen, a touch screen, a keyboard, speakers, a microphone, or the like, sensors such as a GPS sensor, one or more electronic devices 106 of the user, a hardware circuit, a programmable hardware device, one or more processors, and/or a computer readable storage medium that stores code for execution by one or more processors. Other embodiments may include similar or equivalent devices for obtaining tracking information.

In certain embodiments, a user may include any person who uses an electronic device 106. In various embodiments, users may be contacted via one or more electronic devices 106. In certain embodiments, the apparatus 200 obtains tracking information, determines that a user is inaccessible via one communication device, autonomously identifies an alternate device for contacting the user, and reroutes communications based on the alternate device. In general, autonomously identifying alternate contact devices may provide alternate ways to contact a user, without the user explicitly configuring a forwarding scheme, pre-identifying an alternate device, or the like.

In various embodiments, electronic devices 106 may include any devices from which the apparatus 200 may obtain tracking information, and/or any devices to which the apparatus 200 may route incoming communications. For example, as described above, electronic devices 106 may include mobile phones, landline phones, tablets, laptop computers, desktop computers, fitness trackers, televisions, "smart" internet-connected devices, or the like. An electronic device 106 of a user, in various embodiments, may include any electronic device 106 that is owned, used, or otherwise associated with a user. For example, an electronic device 106 associated with a user may include a mobile phone owned by the user, a work phone used by the user, a computer that the user logs into, an internet-connected refrigerator used by the user, or the like.

In one embodiment, at least one of a user's one or more electronic devices 106 may include a communication device. In various embodiments, a communication device may include any device capable of being used to send an outgoing communication or receive an incoming communication for a user. For example, in certain embodiments, a communication device may include a mobile phone, a land line phone, a computer used for email or internet-based messaging, a tablet, or any other device the user uses to send and/or receive phone calls, messages, emails, and/or any other type of communication.

In various embodiments, tracking information obtained by the tracker module 202 may include information about any activity, inactivity, action, behavior, habit, individual event, or the like, for the user or for one or more of the user's electronic devices 106, that may be tracked via one or more of the user's electronic devices 106. In one embodiment, tracking information may include information relating to one or more electronic devices 106, such as a device location, user activity on a device (e.g., browser history, call history, time spent using the device, last time used, or the like), device battery state, device movement history, or the like. In a certain embodiment, tracking information may include information about a user, which is input, stored, or accessed using an electronic device 106, such as user calendar entries, contents of user emails, or the like.

In one embodiment, tracking information obtained by the tracker module 202 may include location information for an electronic device 106. In various embodiments, location information may include any information relating to a location for an electronic device 106. For example, the tracker module 202 may obtain location information using global positioning system ("GPS") satellites, by triangulation using cellular antennas, using a database that correlates IP addresses with provider locations, using search history to identify locations that a user has recently searched for, identifying wireless networks connected to by the device 106, or the like.

In various embodiments, location information may include information relating to an actual, projected, or past location for a device 106 or for the user. In some embodiments, a location may be projected by the tracker module 202 based on tracking information such as calendar information, a customary pattern for the user (e.g., at work on weekdays during business hours), information from relatively stationary electronic devices 106 (e.g., "internet-of-things" appliances, such as internet-enabled refrigerators, washing machines, or the like, that are used at known locations), or the like.

In a certain embodiment, tracking information obtained by the tracker module 202 may include movement information for an electronic device 106. In various embodiments, movement information may include any information relating to movement of an electronic device 106. For example, the tracker module 202 may obtain movement information by comparing location information at different times, by using an accelerometer to detect movement of an electronic device 106, by monitoring signal strength of a radio or other wireless signal, or the like.

In a further embodiment, tracking information obtained by the tracker module 202 may include user activity information for an electronic device 106. In various embodiments, user activity information may include any information relating to user activity via an electronic device 106. For example, a tracker module 202 may obtain user activity information by monitoring activity and inactivity times, actions performed by a user, identifying patterns of use, or the like.

In a certain embodiment, tracking information obtained by the tracker module 202 from one electronic device 106 may include information about other electronic devices 106. For example, the tracker module 202 may obtain tracking information relating to whether two or more electronic devices 106 (e.g., a phone and a wearable device such as a wireless headset) are within a pairing range, information about any other electronic devices 106 currently or recently within various ranges of a first electronic device 106, or the like. Various types of tracking information that may be used to determine an accessibility state or an alternate device for contacting a user will be clear in view of this disclosure.

In one embodiment, the tracker module 202 obtains tracking information by querying one or more electronic devices 106. In another embodiment, the tracker module 202 may obtain tracking information by receiving the tracking information 106 without querying the electronic devices 106. For example, electronic devices 106 may be configured to periodically send tracking information to the tracker module 202.

In a certain embodiment, electronic devices 106 may generally be configured to store or communicate certain types of tracking information, and the tracker module 202 may obtain the tracking information by accessing a location where the tracking information is stored, or by intercepting tracking communication that is being sent to another location. For example, in one embodiment, a web browser may store a browsing history, and a tracker module 202 may access a location where the browsing history is stored. In a further embodiment, a television may send viewing information to a central agency (e.g., for compiling ratings), and a tracker module 202 may copy the viewing information as it is being communicated.

In one embodiment, obtaining tracking information from an electronic device 106 of the user may include communicating the information to a server 102, another electronic device 106 of the user, or the like. In another embodiment, the apparatus 200 may operate on (or partially on) the electronic device 106 that obtains the information, and obtaining information from an electronic device 106 of the user may include generating the information in one part of the electronic device 106 (via a GPS sensor, web browser, application, or the like), and communicating the information to the apparatus 200 on the electronic device 106. Thus, in various embodiments, obtaining information from an electronic device 106 may include receiving information outside the electronic device 106, or receiving information within the electronic device 106.

In one embodiment, the tracker module 202 may operate in the background of one or more of the user's electronic devices 106, to obtain tracking information. In another embodiment, the tracking information may be recorded separately from the apparatus 200, and the tracker module 202 may obtain the tracking information at a later time. For example, in one embodiment, a web browser may maintain a browsing history for the user, and the tracker module 202 may periodically communicate with the web browser to obtain the history.

In the depicted embodiment, the contact apparatus 150 includes an accessibility module 204 that determines that a user is inaccessible via a communication device. The accessibility module 204 determines that a user is inaccessible based on tracking information from the tracker module 202. In various embodiments, an accessibility module 204 may include a data storage device 120, a database in communication with the tracker module 202, user interface elements such as a screen, a touch screen, a keyboard, speakers, a microphone, or the like, one or more electronic devices 106 of the user, a hardware circuit, a programmable hardware device, one or more processors, and/or a computer readable storage medium that stores code for execution by one or more processors. Other embodiments may include similar or equivalent devices for determining whether a user is accessible via a communication device.

In general a user associated with a communication device may be accessible via the communication device if communications sent to the communication device will promptly reach the user, and may be inaccessible otherwise. For example, a user carrying a mobile phone is likely accessible via the mobile phone (assuming a good signal, charged battery, and the like), but a user who has gone to work, leaving the mobile phone at home, is not likely accessible via the mobile phone. In certain embodiments, an accessibility state may identify whether the user is accessible or inaccessible with reference to a particular communication device, or may identify a particular degree of accessibility with respect to a communication device. For example, in various embodiments, an accessibility state may include an indication that the user is accessible, an indication that the user is not accessible, an indication that the user is temporarily inaccessible for a known period of time (e.g., out to lunch), an indication that communications may be reduced in quality (e.g., the user is in an area with bad mobile phone reception), or the like.

In certain embodiments, the accessibility module 204 may determine whether a user is accessible via a communication device. If the user is accessible, then incoming communications may be normally routed to the communication device. By contrast, the accessibility module 204 determining that the user is inaccessible may allow the apparatus 200 to reroute incoming communications.

In certain embodiments, the accessibility module 204 may determine that a user is inaccessible via a communication device by determining an accessibility state. In a further embodiment, the accessibility module 204 may determine whether a user is accessible or inaccessible by comparing an accessibility state or a probability to a threshold. For example, if a user stops using a communication device (e.g., sets down a mobile phone) and does not resume using it for some time, the likelihood that the user is accessible via the communication device may decrease over time. In a certain embodiment, the accessibility module 204 may determine or estimate the likelihood that the user is accessible via the communication device and compare that likelihood to a threshold to determine whether the user is accessible via the communication device.

In another embodiment the accessibility module 204 may determine that a user is inaccessible via a communication device by making a binary determination as to whether the user is accessible or inaccessible, without previously determining an accessibility probability or a more detailed accessibility state to compare to a threshold. In some embodiments, the accessibility module 204 may determine that a user is inaccessible via a communication device by identifying patterns, using rules, or the like. For example, in one embodiment, the accessibility module 204 may determine that a user is inaccessible based on a predetermined length of inactivity for a communication device, a deviation from a user's usual pattern of use for the communication device, a period of inactivity at a location (e.g., parking at a restaurant, followed by lack of accelerometer movement after stopping in the parking lot), a wearable device leaving a pairing range for the communication device, or the like.

In various embodiments, the accessibility module 204 determines that a user is inaccessible based on tracking information from the tracker module 202. Various types of tracking information may indicate whether the user is accessible via a communication device, or may suggest an increased or decreased likelihood of accessibility when considered in view of other tracking information. For example, in one embodiment, activity data from the communication device may indicate that it has been inactive for a long period, suggesting that the user may be inaccessible. Further tracking information from the user's other electronic devices 106 may indicate that the user's location is far from the communication device's location, further confirming the user's inaccessibility.

In one embodiment, the tracking information used by the accessibility module 204 to determine that the user is inaccessible may include location information for the communication device. As described above with regard to the tracker module 202, location information for a communication device may include any information relating to an actual, past, or projected location. Various types of location information may be used by the accessibility module 204 in various ways to determine whether a user is accessible via a communication device. For example, in one embodiment, location information for the communication device may indicate that the communication device is not located near the user. In another embodiment, location information for a communication device may indicate that the communication device is not in a location where the user typically uses it. Further ways of using location information to determine user accessibility will be clear in view of this disclosure.

In one embodiment, the tracking information used by the accessibility module 204 to determine that the user is inaccessible may include movement information for the communication device. As described above with regard to the tracker module 202, movement information for a communication device may include any information relating to movement of the communication device. Various types of movement information may be used by the accessibility module 204 in various ways to determine whether a user is accessible via a communication device.

For example, in one embodiment, movement information for the communication device may indicate that the communication device has not moved for a certain period of time, suggesting that the user may have moved to a different location and left the communication device behind. In another embodiment, movement information for the communication device may indicate that the communication device is moving at a high rate of speed, suggesting that the user may be driving, and thus may be unavailable to respond to text messages. Further ways of using movement information to determine user accessibility will be clear in view of this disclosure.

In one embodiment, the tracking information used by the accessibility module 204 to determine that the user is inaccessible may include user activity information for the communication device. As described above with regard to the tracker module 202, user activity information for a communication device may include any information relating to user activity via the communication device. Various types of user activity information may be used by the accessibility module 204 in various ways to determine whether a user is accessible via a communication device.

For example, in one embodiment, user activity information for the communication device may indicate that the communication device has not been used for a predetermined period of time, an abnormal period of time considering the user's past usage habits, or the like, suggesting that the user be inaccessible via the communication device, for example when the communication device is in an off state or other state inaccessible to a network that communicates with the communication device. In another embodiment, user activity information may indicate that the user has placed the communication device in a limited functionality mode, such as an "airplane mode" or the like, and is therefore not accessible via the communication device. Further ways of using user activity information to determine user accessibility will be clear in view of this disclosure.

In one embodiment, the tracking information used by the accessibility module 204 to determine that the user is inaccessible may include an indication of whether the communication device is within a pairing range of a wearable electronic device for the user. A wearable electronic device may include any electronic device 106 that is capable of being worn by the user (e.g., as a watch, a headset, or the like), that can be paired in some way with the communication device (e.g., via Bluetooth®, an ad hoc wireless network, or the like). For example, in various embodiments, a wearable device may include a wireless headset, a fitness tracker, a hearing aid, a watch, or the like. In certain embodiments, a communication device and a wearable device may be within pairing range if they are paired, or if they are close enough to be capable of establishing a wireless connection for pairing.

In various embodiments, a wearable device, worn by the user, may indicate the user's location, so whether the wearable device is in pairing range of the communication device may indicate whether the user is likely accessible via the communication device. For example, in one embodiment, determining that the communication device is within pairing range of a wearable device may suggest that the user is accessible via the communication device. In another embodiment, determining that the communication device is not within pairing range of a wearable device may suggest that the user is accessible via the communication device.

In some embodiments, tracking information used by the accessibility module 204 to determine that the user is inaccessible may include various combinations of location information, movement information, user activity information, indications of whether wearable devices are within pairing range, and/or other tracking information. In certain embodiments, the accessibility module 204 may combine types of tracking information to increase the accuracy of determinations regarding the user's accessibility. For example, in one embodiment, movement information may indicate that the communication device is stationary. However, a stationary communication device may have been left behind, or may be stationary on a desk right next to the user. Location, activity, or pairing information may resolve ambiguity as to whether the user is accessible via the communication device.

As a further example, in one embodiment, the accessibility module 204 may combine location and movement information to determine whether the user is accessible based on a location where the communication device has stopped moving. For example, if the location where the communication device has stopped moving is inside a user's house, the user may be accessible via the communication device. However, if the location where the communication device has stopped moving is in a parking lot, the user may have left the communication device in his or her car, and may not be accessible via the communication device. Various ways of using and combining tracking information to determine a user's inaccessibility will be clear in view of this disclosure.

In one embodiment, the accessibility module 204 determines that the user is inaccessible prior to the contact router module 208 receiving an incoming communication. In various embodiments, determining that a user is inaccessible prior to receiving an incoming communication may allow a contact identification module 206 to proactively identify an alternate device for contacting the user. Identifying an alternate device in advance may avoid delays in rerouting communications, which might otherwise occur if the accessibility module 204 did not determine an accessibility state until a communication was incoming. For example, in one embodiment, the accessibility module 204 may determine an accessibility state for a user via a phone without actually receiving a phone call, so that any incoming phone call can be forwarded to another phone as necessary.

In one embodiment, the accessibility module 204 determines that the user is inaccessible in response to the user failing to respond to a communication via the communication device. For example, in one embodiment, where the communication device is a phone, the user may fail to answer a phone call. The accessibility module 204 may then determine that the user is inaccessible via that phone, so that the apparatus 200 can identify an alternate device for contacting the user and reroute communications appropriately. In certain embodiments, determining that the user is inaccessible via a communication device in response to the user failing to respond to a communication may result in at least that communication being routed to that communication device despite the user's inaccessibility, but may allow the apparatus 200 to appropriately reroute further communications.

In one embodiment, the accessibility module 204 determines that the user is inaccessible without the user explicitly identifying an accessibility state. Certain call forwarding applications require the user to explicitly identify an accessibility state, such as by setting or modifying a status (e.g., from "available" to "busy" or "do not disturb"), setting up accessibility rules (e.g., not accessible via an office phone outside business hours), or the like. However, requiring the user's explicit involvement in identifying an accessibility state creates a burden on the user, and may result in failing to correctly identify whether the user is inaccessible if the user has not set up rules, set a status, or otherwise explicitly indicated his or her accessibility.

For example, it is not likely that a user would explicitly indicate that he or she is inaccessible via a mobile phone, prior to accidentally leaving the phone in a car. By contrast, determining that a user is inaccessible without the user explicitly identifying an accessibility state may allow the apparatus 200 to identify alternate devices for contacting the user even in situations where the user's inaccessibility may be due to forgetfulness, or where the user has not taken the trouble to set up rules for forwarding communications to alternate devices.

In the depicted embodiment, the contact apparatus 150 includes a contact identification module 206 that autonomously identifies an alternate device for contacting the user. The contact identification module 206 may project, based on the tracking information, that the alternate device is in proximity to the user. In various embodiments, a contact identification module 206 may include a data storage device 120, a database in communication with the tracker module 202, one or more electronic devices 106 of the user, a hardware circuit, a programmable hardware device, one or more processors, and/or a computer readable storage medium that stores code for execution by one or more processors. Other embodiments may include similar or equivalent devices for identifying an alternate device for contacting the user.

In various embodiments, an alternate device for contacting the user may include any communication device to which communications or messages for the user may be routed, other than the communication device through which the user is inaccessible, as determined by the accessibility module 204. For convenience in description, the communication device through which the user is inaccessible, as determined by the accessibility module 204, may be referred to herein as the "inaccessible communication device." The communication device may be itself be accessible or inaccessible, but may nevertheless be referred to as the "inaccessible communication device" based on the user's inaccessibility via the communication device.

In one embodiment, the contact identification module 206 may cooperate with the accessibility module 204 to determine that the user is accessible (or at least more likely to be accessible) via the alternate device. In another embodiment, the contact identification module 206 may identify an alternate device without relying on a determination of the user's accessibility via the alternate device. For example, in one embodiment, if a user is inaccessible via a communication device because the communication device has been turned off, any alternate device in proximity to the user may be a more likely way of reaching the user.

In one embodiment, an alternate device identified by the contact identification module 206 may be a communication device of the user's, other than the inaccessible communication device. For example, in one embodiment, the user may be inaccessible via a work phone, and the contact identification module 206 may identify the user's home phone as an alternate device. In another embodiment an alternate device may be a communication device for a person other than the user. For example, in one embodiment, the contact identification module 206 may identify a friend's or neighbor's phone as an alternate device. In a certain embodiment, an alternate device may be a communication device for a location associated with the user. A location associated with a user may include the user's location, the user's projected location, a location where someone is likely to be able to get a message to the user, or the like. For example, in one embodiment, the tracking information may indicate that the user is at a restaurant, and the contact identification module 206 may identify the restaurant's phone as an alternate device.

In certain embodiments, the contact identification module 206 may identify the alternate device based on tracking information from the tracker module 202. For example, in one embodiment, the contact identification module 206 may project, based on the tracking information from the tracker module 202, that the alternate device is in proximity to the user. In general, a user may be more likely to be accessible via an alternate device close to the user than via an alternate device further from the user. In certain embodiments, an alternate device may be in proximity to the user if the alternate device is within a predetermined radius of the user's actual or projected location, if the alternate device is within the same building as the user, or the like. Various definitions of "in proximity" suitable for identifying an alternate device will be clear in view of this disclosure.

In certain embodiments, the contact identification module 206 may be unable to definitively determine whether the alternate device is in proximity to the user. For example, the user's actual location may be unknown, or may be determined with a low precision. However, the contact identification module 206 may project that the alternate device is in proximity to the user based on the user's past, assumed, or projected location. In various embodiments, projecting that the alternate device is in proximity to the user may refer to determining, predicting, forecasting, or estimating that the user is likely to be close enough to be accessible via the alternate device.

In a certain embodiment, the tracking information used by the contact identification module 206 to project that the alternate device is in proximity to the user may include a location for the inaccessible communication device. For example, in one embodiment, the user's location may be unknown, but the location where the inaccessible communication device was last used may suggest the user's location. If the inaccessible communication device is left outside a building, for example, the user may be inside the building, and the contact identification module 206 may project that an alternate device inside the building is in proximity to the user.

In another embodiment, the tracking information used by the contact identification module 206 to project that the alternate device is in proximity to the user may include a projected location for the user. A projected location for the user may be based on a variety of tracking information from various electronic devices 106, such as calendar entries, patterns in the user's location, electronic devices 106 currently or recently used by the user, or the like. For example in one embodiment, a calendar entry may indicate that the user has a meeting scheduled in a certain location, and the contact identification module 206 may identify a communication device associated with that location as an alternate device for contacting the user.

In another embodiment, the tracking information used by the contact identification module 206 to project that the alternate device is in proximity to the user may include information about one or more devices within range of the inaccessible communication device. In certain embodiments, the communication device may be "within range" of other devices if it is capable of contacting the other devices (e.g., via a direct wireless connection, via a local wireless network, or the like). In various embodiments, the contact identification module 206 may use tracking information about one or more devices that are currently within range of the inaccessible communication device, or about devices that were recently within range.

For example, in one embodiment, if the user travels somewhere with several friends, tracking information from may indicate that the user's mobile phone and the friends' mobile phones were moving as a group. If the user's phone is left somewhere, the contact identification module 206 may project that one of the friend's phones is still in proximity to the user, and may identify one of the friends' phones as an alternate device for contacting the user.

In various embodiments, the contact identification module 206 may autonomously identify an alternate device by determining or selecting the alternate device based on the tracking information, without further user input beyond the tracking information. For example, in a certain embodiment, the contact identification module 206 may autonomously identify the alternate device without the user explicitly identifying the alternate device.

Certain methods of forwarding communications to various devices require users to explicitly identify alternate devices, by setting up call forwarding, by configuring an email account to forward messages to another email account, or the like. However, rerouting that relies on a user explicitly identifying alternate devices, places a burden on the user, and may be ineffective if the user has not identified alternate devices, or has not identified alternate devices appropriate to a particular situation. For example, it is unlikely that a user would set up call forwarding for every location that the user might visit during the course of a day. By contrast, a contact identification module 206 that is autonomous, or independent of user inputs other than the tracking information, may allow the apparatus 200 to flexibly reroute communications without requiring the user to set up call forwarding, identify alternate devices or the like.

In a certain embodiment, the contact identification module 206 may request permission from the alternate device to reroute an incoming communication. In a further embodiment, the contact identification module 206 may request such permission prior to receiving the incoming communication. In some embodiments, as described above, an alternate device may be a communication device for a person other than the user. The person who owns or uses the alternate device may be willing or unwilling to receive communications for the user of the inaccessible communication device.

Requesting permission from an alternate device to reroute an incoming communication may, in certain embodiments, allow the contact identification module 206 to verify that the alternate device is a suitable way to contact the user. For example, if the user is accessible via the alternate device, and if the person who owns or uses the alternate device is willing to allow the alternate device to be used for that purpose, then permission may be granted, and communications may be rerouted. By contrast, if permission is denied, the contact identification module 206 may identify another alternate device for contacting the user. In certain embodiments, requesting permission prior to receiving the incoming communication may avoid problems that occur if a communication is rerouted to an unwilling or otherwise inappropriate recipient.

In the depicted embodiment, the contact apparatus 150 includes a contact router module 208 that reroutes an incoming communication based on the alternate device. In various embodiments, a contact router module 208 may include a server 102, a data storage device 120, a database storing contact information for alternate devices, routing hardware, such as a network or phone switch, router, hub, or the like, one or more electronic devices 106 of the user, a hardware circuit, a programmable hardware device, one or more processors, and/or a computer readable storage medium that stores code for execution by one or more processors. Other embodiments may include similar or equivalent devices for rerouting incoming communications.

In general, in various embodiments, a communication may include any attempt to contact a user via a communication device. For example a communication may be an email, a text message, a multi-media message, a phone call, a message sent via a web-based service, a chat message, or any other type of message or other attempt to contact a user. In further embodiments, an incoming communication may include any communication sent to (or to be received by) the inaccessible communication device, that has not yet been received.

In certain embodiments, the contact router module 208 may reroute an incoming communication by sending it to a destination other than the inaccessible communication device. For example, the contact router module 208 may monitor communication traffic directed to the inaccessible communication device, intercept an incoming communication and send the intercepted communication to a further destination in addition to the inaccessible communication device, or to a destination that replaces the inaccessible communication device. For example, in one embodiment, the contact router module 208 may forward a phone call to another phone, so that the phone call is not received by the inaccessible communication device. In another embodiment, however, the contact router module 208 may copy a text message and send it to another phone, so that the original text message is still received by the inaccessible communication device, and will appear normally in the user's message history even if the user is not currently accessible via that device.

The contact router module 208 reroutes incoming communications based on the alternate device identified by the contact identification module 206. Rerouting may be based on an alternate device in various ways. For example, in one embodiment, rerouting an incoming communication may include forwarding the incoming communication to the alternate device. In another embodiment, rerouting the incoming communication may include relaying contact information for the alternate device back to an initiator of the incoming communication. For example, in one embodiment, the contact router module 208 may reroute a communication based on the alternate device by returning the communication with an indication that the communication was undelivered, including information suggesting that the user might be contacted via the alternate device.

In one embodiment, rerouting the incoming communication may include translating the incoming communication from a first communication mode to a second communication mode. A communication mode, in various embodiments, may refer to any type, format, or protocol for sending a communication. Various communication modes may include telephony protocols, text messaging protocols, email protocols, and the like. In certain embodiments, the contact router module 208 may translate between communication modes. For example, the contact router module 208 may receive a voice call, record a voice mail, and convert the voice mail message to a text message using voice recognition software. In another embodiment, the contact router module 208 may receive a text message and convert the text message using text-to-speech software, to deliver the message to a landline phone. Various ways of translating communications between communication modes will be clear in view of this disclosure.

In one embodiment, the contact router module 208 may reroute communications transparently, without any indication that the communication has been rerouted. For example, if the inaccessible communication device and the alternate device are different phones for the same user, the contact router module 208 may forward a phone call without any indication that it was originally directed to a different phone.

In another embodiment, however, the contact router module 208 may provide information about rerouting the incoming communication. Information about rerouting may be provided to the initiator and/or the recipient of the incoming communication. For example, in one embodiment, a contact router module 208 may forward a communication to an alternate device and may communicate with the initiator of the message to clarify that the message has been forwarded. In another embodiment, a contact router module 208 may add information to a forwarded message to clarify, to the recipient using the alternate device, that the message has been forwarded. For example, if a call is forwarded from one person's phone to another person's phone, the contact router module 208 may preface the forwarded call with a recording indicating who the caller is really attempting to contact. Providing information about rerouting may avoid confusing the initiator and/or the recipient of the incoming communication, when the communication is rerouted.

Figure 3:
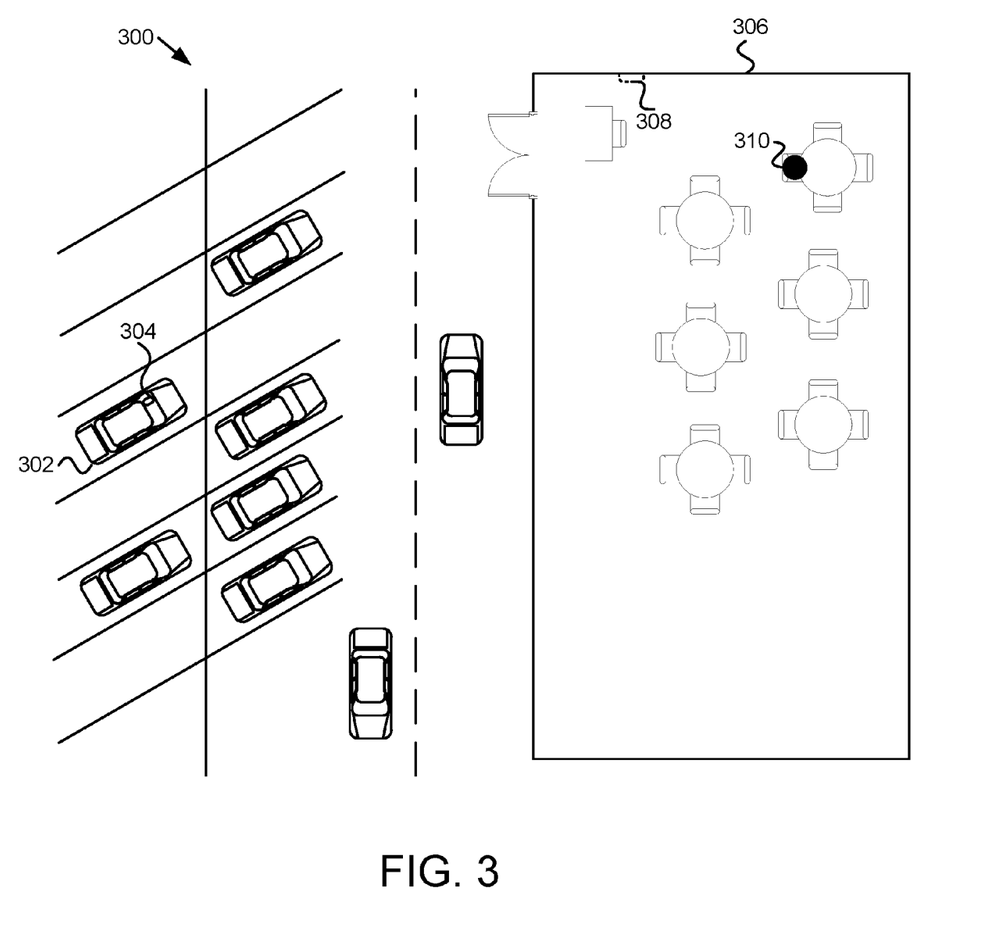
FIG. 3 is a top view illustrating circumstances in which an apparatus or system for contacting a user via an alternate device would be used.

FIG. 3 depicts circumstances 300 in which an apparatus or system for contacting a user via an alternate device would be used. The depicted circumstances 300 are for illustrative purposes, and are not intended to be limiting, as an apparatus or system for contacting a user via an alternate device could be used in a variety of circumstances.

In the depicted circumstances 300, a user 310 of a communication device 304 (e.g., a mobile phone) is visiting a restaurant 306. The user 310 has driven to the restaurant 306, but has unfortunately left the communication device 304 in the car 302. Accordingly, in the absence of an apparatus or system for contacting a user via an alternate device, urgent calls, messages or the like directed to the communication device 304 would not promptly reach the user 310.

However, a tracker module 202 may obtain tracking information from one or more electronic devices 106 of the user 310, including the communication device 304. The tracking information might include the location of the communication device 304, movement or activity information showing that the communication device 304 is idle, a calendar entry showing that the user 310 has a lunch meeting at this restaurant 306, information from other electronic devices 106 for the user 310 (e.g., a fitness tracker), an indication that a wearable device for the user 310 is no longer in range of the communication device 304, or the like.

An accessibility module 204 may determine, based on the tracking information, that the user 310 is not accessible via the communication device 304. For example, the tracking information may indicate that the communication device 304 is in the parking lot while the user 310 is likely in the restaurant 306.

A contact identification module 206 may identify an alternate device for contacting the user 310, where the alternate device is projected, based on the tracking information to be in proximity to the user 310. For example, the tracking information may indicate that the user 310 is likely in the restaurant 306, and the contact identification module 206 may search the internet, reference a database, or the like, to identify a land line phone number for the restaurant 306. The contact identification module 206 may then identify the land line phone 308 for the restaurant 306 as an alternate device for contacting the user 310.

A contact router module 208 may reroute an incoming communication based on the alternate device by forwarding a communication to the land line phone 308 for the restaurant 306. In one embodiment, the contact router module 208 may translate the communication between communication modes. For example, a text message may be converted using text-to-speech software for transmission to the phone 308. In a further embodiment, the contact router module 208 may provide information about rerouting to the initiator and/or the recipient of the rerouted communication. For example, a person working at the front desk of the restaurant 306 may expect calls for placing reservations, and may not expect calls that were intended for the user 310. A preface to the forwarded communication may indicate that it is intended for the user 310.

Figure 4:
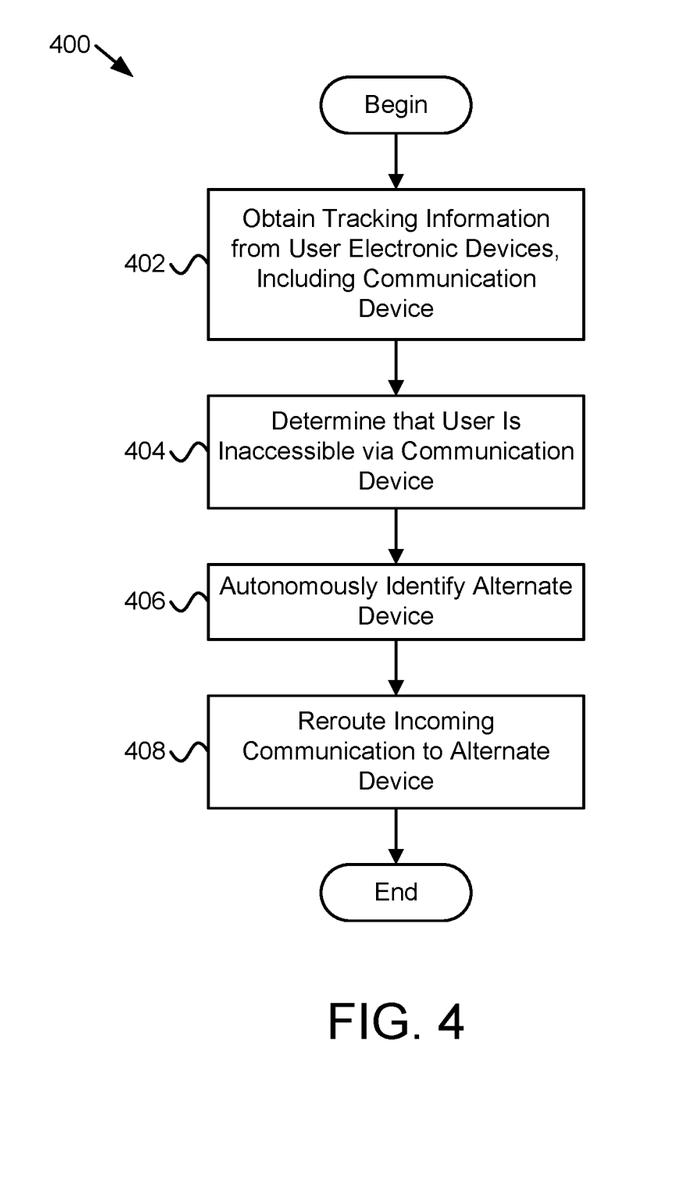
FIG. 4 is a schematic flow chart diagram illustrating one embodiment of a method for contacting a user via an alternate device.

FIG. 4 depicts one embodiment of a method 400 for contacting a user via an alternate device. The method 400 begins, and obtains 402 tracking information from one or more electronic devices 106 of a user, including a communication device. In one embodiment, the tracker module 202 obtains 402 the tracking information. The method 400 determines 404, based on the tracking information, that the user is inaccessible via the communication device. In one embodiment, the accessibility module 204 determines 404 that the user is inaccessible via the communication device. The method 400 autonomously identifies 406 an alternate device for contacting the user, where the alternate device is projected, based on the tracking information, to be in proximity to the user. In one embodiment, the contact identification module 206 autonomously identifies 406 the alternate device. The method 400 reroutes 408 an incoming communication based on the alternate device, and the method 400 ends. In one embodiment, the contact router module 208 reroutes 408 the incoming communication.

Figure 5:
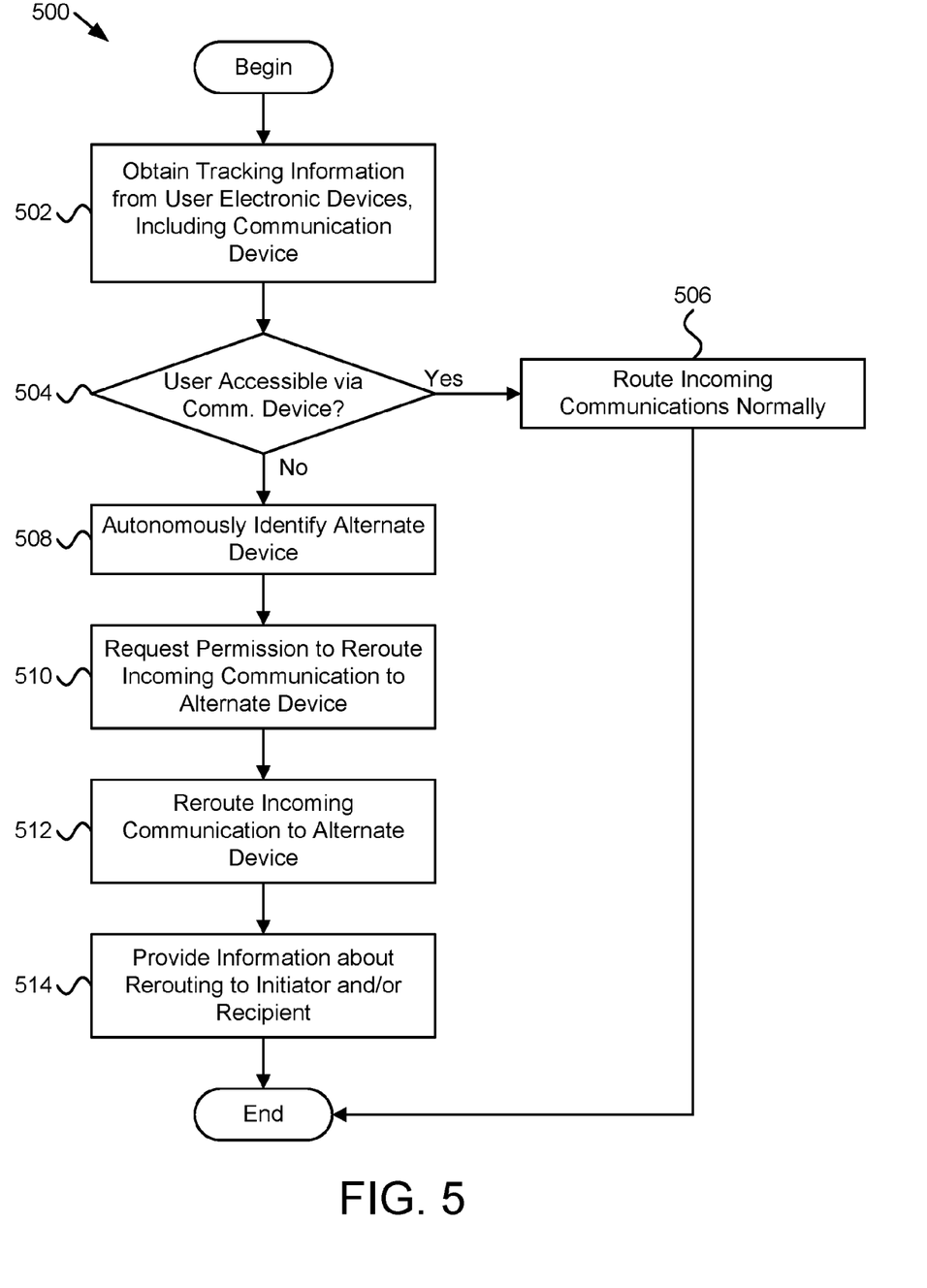
FIG. 5 is a schematic flow chart diagram illustrating another embodiment of a method for contacting a user via an alternate device.

FIG. 5 depicts another embodiment of a method 500 for contacting a user via an alternate device. The method 500 begins, and obtains 502 tracking information from one or more electronic devices 106 of a user, including a communication device. In one embodiment, the tracker module 202 obtains 502 the tracking information. The method 500 determines 504, based on the tracking information, whether the user is accessible via the communication device. In one embodiment, the accessibility module 204 determines 504 whether the user is inaccessible. If the user is accessible via the communication device, the method 500 routes 506 incoming communications normally (e.g., to the communication device), and the method 500 ends. In one embodiment, the contact router module 208 routes 506 incoming communications normally.

If the user is inaccessible via the communication device, the method 500 autonomously identifies 508 an alternate device for contacting the user, where the alternate device is projected, based on the tracking information, to be in proximity to the user. In one embodiment, the contact identification module 206 autonomously identifies 508 the alternate device. The method 500 requests 510 permission to reroute one or more incoming communications to the alternate device. In one embodiment, the contact identification module 206 requests 510 permission to reroute communications. The method 500 reroutes 512 an incoming communication based on the alternate device. In one embodiment, the contact router module 208 reroutes 512 the incoming communication. The method 500 provides 514 information about the rerouting to the initiator and/or the recipient of the incoming communications, and the method 500 ends. In one embodiment, the contact router module 208 provides 514 information about the rerouting.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a tracker module that obtains tracking information from one or more electronic devices of a user, at least one of the one or more electronic devices comprising a communication device;
   an accessibility module that determines, based on the tracking information, that the user is inaccessible via the communication device, wherein determining that the user is inaccessible via the communication device comprises determining that communications sent to the communication device will not promptly reach the user;
   a contact identification module that autonomously identifies an alternate device for contacting the user, the alternate device projected, based on the tracking information, to be in proximity to the user; and
   a contact router module that reroutes an incoming communication based on the alternate device,
   wherein the tracking information used to determine that the user is inaccessible comprises one or more of location information for the communication device, movement information for the communication device, user activity information for the communication device, and an indication of whether the communication device is within a pairing range of a wearable electronic device for the user.

2. The apparatus of claim 1, wherein the accessibility module determines that the user is inaccessible prior to the contact router module receiving the incoming communication.

3. The apparatus of claim 1, wherein the accessibility module determines that the user is inaccessible in response to the user failing to respond to a communication via the communication device.

4. The apparatus of claim 1, wherein the tracking information used to project that the alternate device is in proximity to the user comprises one or more of a location for the communication device, a projected location for the user, and information about one or more devices within range of the communication device.

5. The apparatus of claim 1, wherein the alternate device comprises one or more of a communication device for a person other than the user and a communication device for a location associated with the user.

6. The apparatus of claim 1, wherein the contact identification module, prior to receiving the incoming communication, requests permission from the alternate device to reroute the incoming communication.

7. The apparatus of claim 1, wherein rerouting the incoming communication comprises forwarding the incoming communication to the alternate device.

8. The apparatus of claim 1, wherein rerouting the incoming communication comprises relaying contact information for the alternate device back to an initiator of the incoming communication.

9. The apparatus of claim 1, wherein rerouting the incoming communication comprises translating the incoming communication from a first communication mode to a second communication mode.

10. The apparatus of claim 1, wherein the contact router module provides information about rerouting the incoming communication, to one or more of an initiator and a recipient of the incoming communication.

11. The apparatus of claim 1, wherein the accessibility module determines that the user is inaccessible without the user explicitly identifying an accessibility state.

12. The apparatus of claim 1, wherein the contact identification module autonomously identifies the alternate device without the user explicitly identifying the alternate device.

13. A method comprising:
   obtaining tracking information from one or more electronic devices of a user, at least one of the one or more electronic devices comprising a communication device;
   determining, based on the tracking information, that the user is inaccessible via the communication device, wherein determining that the user is inaccessible via the communication device comprises determining that communications sent to the communication device will not promptly reach the user;
   autonomously identifying an alternate device for contacting the user, the alternate device projected, based on the tracking information, to be in proximity to the user; and
   rerouting an incoming communication based on the alternate device,
   wherein the tracking information used to determine that the user is inaccessible comprises one or more of location information for the communication device, movement information for the communication device, user activity information for the communication device, and an indication of whether the communication device is within a pairing range of a wearable electronic device for the user.

14. The method of claim 13, wherein determining that the user is inaccessible occurs prior to receiving the incoming communication.

15. The method of claim 13, wherein the tracking information used to project that the alternate device is in proximity to the user comprises one or more of a location for the communication device, a projected location for the user, and information about one or more devices within range of the communication device.

16. The method of claim 13, wherein rerouting the incoming communication further comprises one or more of forwarding the incoming communication to the alternate device and relaying contact information for the alternate device back to an initiator of the incoming communication.

17. The method of claim 13, further comprising providing information about rerouting the incoming communication, to one or more of an initiator and a recipient of the incoming communication.

18. A program product comprising a non transitory computer readable storage medium that stores code executable by a processor, the executable code comprising code to perform:

obtaining tracking information from one or more electronic devices of a user, at least one of the one or more electronic devices comprising a communication device;

determining, based on the tracking information, that the user is inaccessible via the communication device, wherein determining that the user is inaccessible via the communication device comprises determining that communications sent to the communication device will not promptly reach the user;

autonomously identifying an alternate device for contacting the user, the alternate device projected, based on the tracking information, to be in proximity to the user; and     rerouting an incoming communication based on the alternate device,     wherein the tracking information used to determine that the user is inaccessible comprises one or more of location information for the communication device, movement information for the communication device, user activity information for the communication device, and an indication of whether the communication device is within a pairing range of a wearable electronic device for the user.

\* \* \* \* \*